Patented Oct. 22, 1929

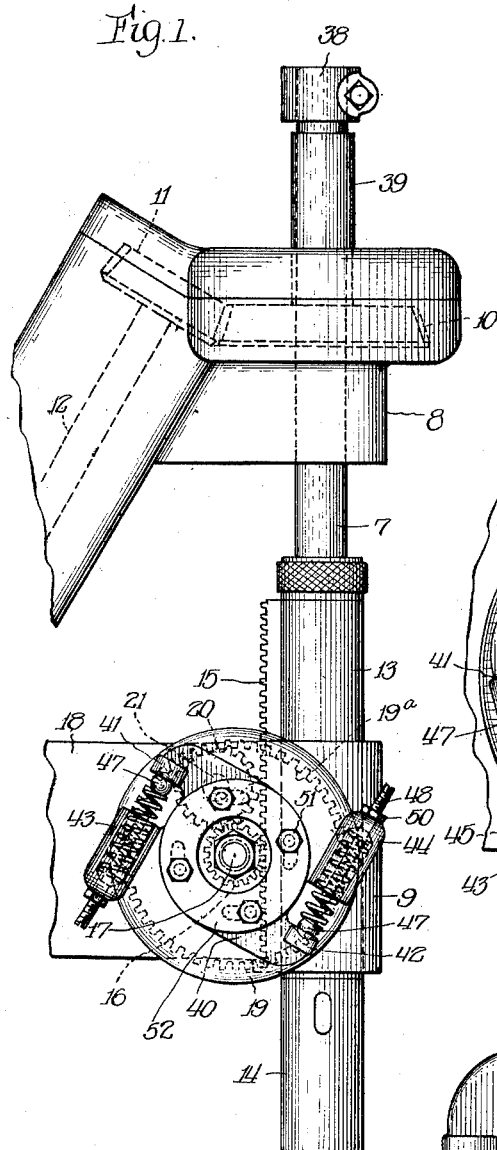

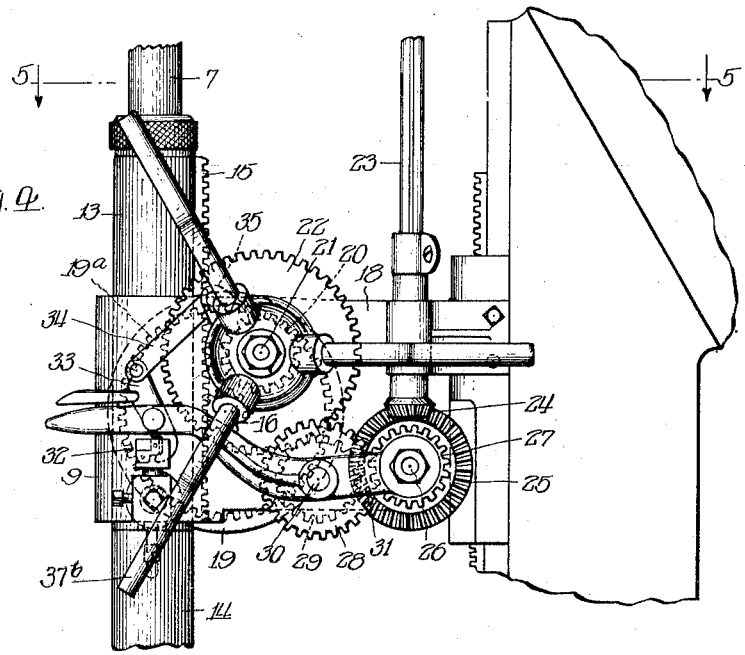

1,732,559

UNITED STATES PATENT OFFICE

ALBERT M. JOHNSON, OF ROCKFORD, ILLINOIS, ASSIGNOR TO BARNES DRILL COMPANY, OF ROCKFORD, ILLINOIS, A CORPORATION OF ILLINOIS

MACHINE-TOOL FEED

Application filed April 30, 1924. Serial No. 710,104.

The invention relates to a machine tool for producing a finishing or facing cut upon articles of manufacture such, for example, as bushings, nuts, etc.; and the object of the invention generally stated is to provide a construction permitting of an interruption in the feeding movement of the tool spindle while the feed mechanism continues in operation to hold the tool to the work, thereby causing the tool to dwell so as to produce a smooth or finished surface.

A more specific object of the invention is to provide means of an advantageous construction for interrupting the feeding movement of the tool and means associated with the feed mechanism for permitting such interruption while continuing to hold the cutting tool to the work.

The objects of the invention thus set forth together with other and ancillary advantages are attained by the construction and arrangement shown in the accompanying drawings forming part hereof, wherein Figure 1 is a fragmentary side elevational view of a machine tool embodying my invention.

Fig. 2 is a fragmentary elevational view on a larger scale of the dwelling means, that is to say, the means permitting the interruption of the feeding movement.

Fig. 3 is a detail view of one of the parts of said dwell mechanism.

Fig. 4 is a fragmentary side elevational view looking from the side opposite that shown in Fig. 1 and illustrating the feed mechanism employed.

Fig. 5 is a horizontal sectional view taken approximately in the plane of line 5—5 of Fig. 4 and illustrating the means for automatically rendering the feed mechanism inoperative after the completion of the facing operation.

The machine selected for purposes of illustration is of the vertical drilling and boring type. It comprises a tool spindle 7 mounted for up and down movements in an upper stationary head 8 and a lower head 9. The head 8 is in the form of a gear casing enclosing a crown gear 10 having a splined connection with the spindle 7 and meshing with a pinion 11 on a shaft 12 connected with a suitable source of power. The head 9 is cylindrical in form adapted to receive for vertical sliding movement the usual spindle sleeve 13 suitably connected with the spindle so as to be held against longitudinal movement thereon but to permit of the rotaion of the spindle. At its lower end the spindle carries a suitable tool chuck 14.

The spindle sleeve 13 has rigid therewith the usual rack 15 with which meshes a pinion 16 of the feed mechanism. Said pinion 16 is fast upon a cross shaft 17 (Fig. 5) journaled in a bracket 18 carrying at its forward end the head 9. Said shaft 17 has mounted thereon an annular casing 19 having internally cut gear teeth 19$^a$ with which meshes a pinion 20 on a countershaft 21 also journaled in the bracket 18. The shaft 21 extends through the bracket to the opposite side thereof and has fast thereon a spur gear 22 arranged in the present embodiment to be driven from a vertical shaft 23 through reduction gearing including a bevel pinion 24 rigid with the lower end of the shaft 23 and meshing with a bevel gear 25 on a shaft 26. Rigid with the pinion 25 is a spur pinion 27 meshing with a spur gear 28 with which is rigid a pinion 29 arranged to mesh with the spur gear 22. The gears 28 and 29 are journaled at 30 upon an arm 31 which is pivoted on the shaft 26, and a suitable latch device 32 normally holds the arm 31 in raised position in which the pinion 29 meshes with the gear 22. This latch device comprises a pivoted latch member 33 connected by a link 34 with an arm 35 rigid with a nut 36 screw-threaded on the end of the shaft 21. An adjustable stop 37 on said shaft is arranged to be engaged by the nut 36 as the latter travels thereon in the rotation of the shaft whereby to cause the nut and thereby the arm 35 to rotate in a direction to release the latch. The arrangement is such that at the end of the feeding movement the latch is released to permit the arm 31 to drop, thus causing the pinion 29 to become disengaged from the gear 22. 37$^a$ is a disk fast on the shaft 21 and having radial arms 37$^b$ whereby to enable the shaft to be rotated manually.

In performing the facing operation the spindle is fed downwardly by the operation of the feed mechanism to a desired predetermined depth. Thereupon the feeding movement is interrupted while the feed mechanism continues to operate to hold the cutting tool to the work. The means for thus interrupting the movement of the spindle may be of any suitable or preferred character. In the present instance I provide a stop member on the spindle adapted to engage with a stationary part on the machine frame. This stop I have indicated at 38 which is in the form of a split collar to be adjustably clamped upon the extreme upper end of the spindle. The collar coacts with the frame through a sleeve 39 and the crown gear 10 to limit the downward descend of the spindle.

The construction which I provide for permitting the operation of the feed mechanism after the movement of the spindle has been stopped comprises a yieldable lost-motion connection between the shaft 17 and the annular casing 19 which latter is loose upon the shaft. To this end I provide a head 40 keyed upon the shaft 17 and having at diametrically opposite points stop lugs 41 and 42. These lugs are arranged in opposed relation to hollow heads 43 and 44 rigid with the casing 19. Coiled compression springs 45 and 46 are entered in each of said hollow heads 43 and 44 and are arranged to exert substantial pressure upon the lugs. In the present instance I have shown balls 47 interposed between the springs and the lugs 41 and 42, and also adjusting screws in each of the tubular heads carrying bearing members 49 which provide seats for the inner ends of the springs. The balls 47 and bearing members 49 may, however, be omitted if desired. By adjusting the screws 48 the pressure of the springs upon the lugs 41 and 42 may be varied at will. A lock nut 50 is arranged to lock each screw in position in its head. To hold the parts in proper relation I provide a pin and slot connection including a plurality of bolts 51 entered through apertures in a ring or plate 52 seated upon the outer face of the head 40. Said bolts also pass through slots 53 equidistantly spaced about the head 40 and thence into the outer wall of the casing 19. It will be observed that the bolts operating in the slots 53 will permit of a limited relative movement between the head and the casing.

It will also be seen that the adjusting screws 48 are made of substantial length so that when it is desired they may be adjusted into engagement with the balls 47, or, if the balls are not employed, with the lugs 41 and 42. This serves to lock the head 40 and the casing 19 against relative movement, the bolts 51 in this adjustment of the parts being held against the opposite ends of the slots 53 from that shown in Fig. 2. Thus a rigid connection between the feed mechanism and the spindle is provided for use when the nature of the work does not require a dwell for a facing operation.

In operation downward movement of the spindle 7 by the operation of the feed mechanism is interrupted at the end of a predetermined feeding movement by the sleeve 39 thrusting against the crown gear 10 mounted in the head 8 of the machine frame. The traveling nut 36 on the automatic feed release means has been set, however, so that when the downward movement of the spindle is thus interrupted the feed mechanism will not be stopped but will continue in operation. As a result the casing 19 continues to rotate under the action of the pinion 20 on the shaft 21 meshing with the internal gear teeth 19ª, but since the shaft 17 because of its connection with the spindle 7 is unable to move farther, the head 40 rigid with the shaft also remains stationary and the casing 19 in its rotation moves relative to the head 40 as permitted by the yielding of the springs 45 and 46. The continued movement of the shaft 21 with the casing 19 moves the nut 36 into engagement with the stop 37 and automatically discontinues the operation of the feed mechanism. Thus it will be observed that the construction provided permits of a dwell in the feeding movement of the tool while the feed mechanism continues in operation, and this dwell is made of sufficient length only to permit the removal of the burr or shoulder which otherwise would be produced had the feeding movement continued. It will, of course, be understood that the springs 45 and 46 are so tensioned as to overcome the normal resistance to the feeding movement in the cutting operation.

The construction provided for the dwell mechanism is exceedingly simple in character and yet it effectually accomplishes what has heretofore to my knowledge been accomplished only by hand.

I claim as my invention:

1. In a machine tool, the combination of a spindle, means for feeding the spindle longitudinally, means for automatically rendering the feed mechanism inoperative, and means adapted to stop the spindle at a predetermined point in its movement and prior to the operation of said automatic means, said feed mechanism having means associated therewith adapted to permit the operation of the feed mechanism after the movement of the spindle has been interrupted by said stopping means.

2. In a machine tool, the combination of a spindle, means for feeding the spindle longitudinally, means for automatically rendering the feed mechanism inoperative, means adapted to stop the spindle at a predetermined point in its movement and prior to the operation of said automatic means, and yieldable means adapted to permit the operation of the feed mechanism after the movement of the spindle has been interrupted by said stopping means.

3. In a machine tool, the combination of a spindle, means for feeding the spindle longitudinally, means for automatically rendering the feed mechanism inoperative, means adapted to stop the spindle at a predetermined point in its movement and prior to the operation of said automatic means, and means including a spring interposed between two relatively movable parts of the feed mechanism adapted to permit the operation of the feed mechanism after the movement of the spindle has been interrupted by said stopping means.

4. In a machine tool, the combination of a spindle having a limited movement in one direction, a shaft having a gearing connection with the spindle, an annular hollow member loose on said shaft and having an internal gear near its periphery, a head fast upon the shaft and having a yieldable connection with said member, and means including a pinion meshing with said internal gear operable to rotate it and through said yieldable connection move the spindle to the limit of its movement.

5. In a machne tool, the combination of a spindle having a limited movement in one direction, a shaft having a gearing connection with the spindle, an annular hollow member loose on said shaft and having an internal gear near its periphery, a head fast upon the shaft and having a yieldable connection with said member, means including a pinion meshing with said internal gear operable to rotate it and through said yieldable connection move the spindle to the limit of its movement, and a pin and slot connection between said members.

6. A machine tool having a spindle mounted for longitudinal movement, mechanism comprising a shaft operatively connected with a source of power, a member having a gearing connection with said shaft, a second member having a gearing connection with the spindle, and means normally permitting of a limited relative movement between said members but adapted to lock said members against such movement whereby to provide a positive connection between the shaft and the spindle.

7. A machine tool having a spindle mounted for longitudinal movement, mechanism comprising a shaft operatively connected with a source of power, a member having a gearing connection with said shaft, a second member having a gearing connection with the spindle, one of said members having a stop shoulder, a screw carried by the other one of said members, a spring acting between the members, and means connecting the members together permitting of a limited movement therebetween, said screw being operable into engagement with said lug whereby to lock the two members against relative movement.

8. In a machine tool, a spindle, means for limiting the movement of said spindle toward the work, a member geared to said spindle, a second member connected to a source of power, a yieldable connection between said members permitting continued movement of said second member after said spindle has reached the limit of its travel, and a latch mechanism for automatically disconnecting said second member and the source of power.

9. In a machine tool, the combination with a spindle, of means for arresting the longitudinal movement of said spindle at a predetermined point, feeding mechanism for the spindle including means permitting continued operation of the feeding mechanism after said spindle has reached its limited position, and automatic means for interrupting the operation of said feeding mechanism after a predetermined interval of time.

10. A machine tool having a rotatable and reciprocable spindle, a power actuated feed drive, means providing a lost motion connection with the spindle including two relatively movable parts, and a spring interposed between said parts and normally acting to transmit feed motion to the spindle, means operable at a predetermined point in the feeding movement of the spindle to cause said connection to yield while continuing to apply pressure to the spindle, and means operable at will to lock said two parts rigidly together.

11. In a machine tool, the combination of a spindle having a limited movement in one direction, a shaft having a gearing connection with the spindle, a circular member having gear means rigid therewith and operatively connected to a source of power, said member being loosely rotatable on said shaft, a second circular member in juxtaposition to said first circular member and rigid with said shaft, two peripherally spaced sets of opposed lugs formed respectively on said members, and spring means disposed between each of said sets of lugs to provide a yieldable driving connection between said members.

12. In a machine tool, the combination of a spindle having a limited movement in one direction, a shaft having a gearing connection with the spindle, an annular member loose on said shaft and having a gear coaxial and rigid therewith, a head fast upon the shaft and having a yieldable connection with said member, and means including a pinion meshing with said gear operable to rotate it and through said yieldable connection move the spindle to the limit of its movement.

In testimony whereof, I have hereunto affixed my signature.

ALBERT M. JOHNSON.